R. H. HENEMIER.
TIRE VALVE.
APPLICATION FILED JAN. 9, 1915

1,296,517.

Patented Mar. 4, 1919.

WITNESSES
Gladys Ford
Linda Applegate

INVENTOR
Robert H. Henemier
By Myron F. Hill
Atty

UNITED STATES PATENT OFFICE.

ROBERT H. HENEMIER, OF NEW YORK, N. Y., ASSIGNOR TO A. SCHRADER'S SON, INCORPORATED, OF BROOKLYN, NEW YORK, A CORPORATION OF NEW YORK.

TIRE-VALVE.

1,296,517.  Specification of Letters Patent.  Patented Mar. 4, 1919.

Application filed January 9, 1915. Serial No. 1,324.

*To all whom it may concern:*

Be it known that I, ROBERT H. HENEMIER, citizen of the United States, and resident of New York, in the county of New York and State of New York, have invented certain new and useful Improvements in Tire-Valves, of which the following is a specification.

My invention consists of a tire valve for pneumatic tires.

One of the objects of my invention is means to render the joint between the stem and the valve chamber or socket air-tight without danger of the parts sticking or "freezing" together to such an extent as to make them difficult to separate for purposes of repair.

Another object of my invention is a simplified construction accomplishing all the essential functions of the tire valve at a lower cost of manufacture.

Another object of my invention is a construction that permits more rapid inflation and deflation.

When a tire requires repair, it is the custom to unscrew and remove the inner portions of the valve to provide rapid deflation. My construction renders this unnecessary.

Another object of my invention is to so construct the inside portion that it will fit in other shells or stems on the market and to so construct the shell or stem that the insides of other tire valves will not fit my shell or stem.

Another object of my invention is a construction adapted to be taken apart easily for the purpose of cleaning.

Another object of my invention is a provision for the accurate closing of the valve for the purpose of eliminating one of the causes of leakage.

Another object of my invention is means for removing the inside of the valve without employing the cap as a screw driver. The cap in service often becomes so damaged that it can not be used as a screw driver. By means of my construction, no screw driver on the cap is necessary.

In the drawings:—

Figures 1, 2:
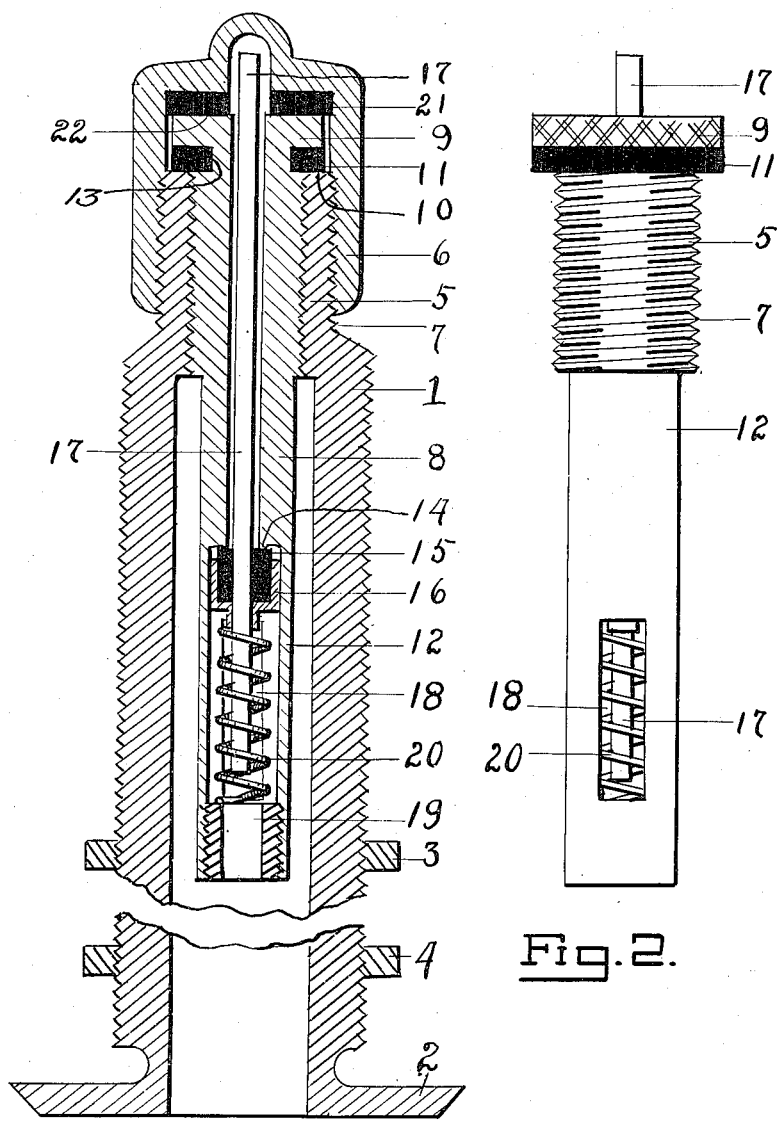
Figure 1 is a vertical enlarged section of a shell and valve.
Fig. 2 is an elevation of the valve socket.

In my invention a stem 1 is provided with the usual flange 2 and nuts 3 and 4 for the purpose of securing the stem to the inner and outer casings of a pneumatic tire. The top of the stem has a reduced diameter 5 having screw threads and adapted to receive the cap 6 threaded to match.

Within the stem of the valve, the screw thread 7 is adapted to receive the inside, threaded portion or socket 8 of the valve. The socket has a manipulating flange or knurled top 9 by means of which it may be screwed by hand into the top of the stem.

The stem has a flat top 10, smoothed off to receive a packing washer 11 adapted to be pinched between the knurled head 9 and the top of the stem 1. When the socket 8 is screwed into the stem, the packing 11 renders the joint between the two impervious to the passage of air. The washer 11 is secured to the socket by being inserted in the annular groove 13. The socket 8 has within it a valve seat 14 as shown in Fig. 1 against which rests the rubber valve 15 contained within the cup 16 which is secured to the central pin on wire 17 of the valve. The cup 16 fits the bore of the tubular portion 12 and is thus held squarely in position to tightly close the valve. Only when the cup is pressed downward past the upper end of the slots 18 does the air escape. When this happens, the air passes out through the openings 18 which may have an area very much larger than in the ordinary tire valve and thereby permit rapid deflation as well as inflation. The tubular portion 12 is smaller than the bore of the stem thus permitting the air to escape by the annular passage around it.

Surrounding the pin 17 and pressing between the bottom of the cup 16 and the top of the threaded cylindrical portion 19 is the compression spring 20 adapted to hold the valve 15 against its seat. The lower end of the pin 17 below the valve may be omitted.

Screwed to the reduced portion 5 of the stem 1, is the cap 6 containing a washer 21 adapted to impinge upon the top flat surface 22 of the manipulating flange 9 to furnish an additional air tight joint to prevent the escape of air. The cap acts upon the top of the valve chamber, both of which screw into place preferably with threads of different sizes, coöperating with each other to bind each other in place, one acting as a lock nut for the other.

My construction permits the tire to be deflated with great ease. By turning the manipulating flange 9 in a direction to unscrew the same from the stem, air is permitted to pass in small quantities up through the threads 7, without the assistance of the manipulator in depressing the pin 17. Heretofore, it has been necessary to hold the pin 17 down by some means during such deflation. My construction renders this unnecessary. When the deflation has occurred to a desired degree, the flange 9 may be screwed down again making an air tight joint at the top 10 of the stem.

When it is desired to remove the valve socket, it is unscrewed by grasping the manipulating flange directly with the fingers. During this operation the pressure of air passing up through the threads acts against the under face of the washer 11 and tends to assist in separating the washer from its seat.

It will be observed that by the present invention the use of a special tool for inserting or removing the valve socket is avoided. It will also be seen that the manipulating flange being of slight depth and of less diameter than the outer end portion of the valve stem, it may be freely inclosed within the standard pump coupling so that the latter engages the valve casing as distinguished from the valve socket or manipulating flange. It will also be seen that the packing washer is carried directly under the flange and presses against the top of the valve stem, so that a larger and more robust packing can be conveniently used than would be the case if the packing were mounted lower down on the valve socket, so that it would enter the valve stem.

Many variations of my invention may be made.

What I claim and desire to secure Letters Patent for is:—

1. In a tire valve, the combination of a tubular stem member having its outer end threaded to receive a standard size coupling of an inflating device and a self contained valve unit threaded thereto and provided with an integral manipulating flange of a diameter less than said outer end portion and of slight depth to lie close to said end portion to be freely inclosed within the coupling, said valve unit being provided with a washer arranged to underlie the manipulating flange for sealing the stem by engaging the end thereof and an inwardly directed valve seat, and a yielding plunger engaging said seat.

2. As a new article of manufacture, a self contained valve unit having a threaded body portion for engagement with a standard valve stem having an internal thread, said valve unit having an integral manipulating flange on its outer end of a size to be freely inclosed within the coupling of an inflating device, a washer arranged to underlie the manipulating flange for sealing the stem by engaging the end thereof, a slotted tubular extension integrally formed on the inner end of the valve unit, an inwardly directed valve seat formed within the same, a plunger fitted to reciprocate within the tubular extension, a washer on the plunger to engage the valve seat, and with openings from the side into said tubular extension, a deflating pin connected with the plunger and outwardly extended through the bore and a spring fitted onto the pin and confined in the socket beneath the plunger to exert a closing pressure thereon substantially as described.

3. In a tire valve, the combination of a tubular stem member having its outer end threaded to receive a standard size coupling of an inflating device and a self-contained valve unit threaded thereto and provided with a manipulating flange rigidly connected therewith of a diameter less than said outer end portion and of slight depth to lie close to said end portion to be freely inclosed within the coupling, said valve unit being provided with a washer arranged to underlie the manipulating flange for sealing the stem by engaging the end thereof and an inwardly-directed valve seat and a yielding plunger engaging said seat.

Signed at New York, in the county of New York and State of New York, this 11th day of November, A. D. 1914.

ROBERT H. HENEMIER.

Witnesses:
MYRON F. HILL,
MASON JONES.